(12) United States Patent
Frederick (10) Patent No.: US 6,355,932 B1
(45) Date of Patent: Mar. 12, 2002

(54) MAXIMUM VOLUME RUGGEDIZED NUCLEAR DETECTOR

(75) Inventor: Larry D. Frederick, Huntsville, AL (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/296,614

(22) Filed: Apr. 23, 1999

Related U.S. Application Data

(63) Continuation-in-part of application No. 09/030,282, filed on Feb. 25, 1998, now Pat. No. 5,962,855.

(51) Int. Cl.$^7$ .................................................. G01T 1/20
(52) U.S. Cl. ................................. 250/368; 250/361 R
(58) Field of Search ........................... 250/368, 361 R, 250/363.1, 269.1

(56) References Cited

U.S. PATENT DOCUMENTS

| | | | |
|---|---|---|---|
| 2,902,603 A | 9/1959 | Ferre | 250/368 |
| 2,945,955 A | 7/1960 | Mossop et al. | 250/361 R |
| 2,949,534 A | 8/1960 | Youmans | 250/261 |
| 3,049,620 A | 8/1962 | George et al. | 250/261 |
| 3,068,359 A * | 12/1962 | Carlson | 250/366 |
| 3,073,954 A | 1/1963 | Carlson et al. | 250/368 |
| 3,265,893 A * | 8/1966 | Rabson et al. | 250/261 |
| 3,930,160 A * | 12/1975 | Swinehart | 250/361 R |
| 3,950,646 A | 4/1976 | Whitlock | 250/361 R |
| 3,960,756 A | 6/1976 | Noakes | 252/301.18 |
| 4,004,151 A | 1/1977 | Novak | 250/485.1 |
| 4,008,945 A | 2/1977 | Schere | 359/350 |
| 4,063,803 A | 12/1977 | Wright et al. | 359/894 |
| 4,158,773 A | 6/1979 | Novak | 250/361 R |
| 4,275,298 A | 6/1981 | Wykes et al. | 250/255 |
| 4,360,733 A | 11/1982 | Novak et al. | 250/361 R |
| 4,383,175 A | 5/1983 | Toepke | 250/368 |
| 4,666,251 A | 5/1987 | Liberman et al. | 359/894 |
| 4,676,817 A | 6/1987 | Tailor et al. | 65/43 |
| 4,764,677 A | 8/1988 | Spurney | 250/361 R |
| 4,765,602 A * | 8/1988 | Roeseler | 267/148 |
| 4,833,320 A | 5/1989 | Hurlbut | 250/256 |
| 4,900,937 A | 2/1990 | Dayton et al. | 250/483.1 |
| 4,994,673 A | 2/1991 | Perna et al. | 250/483.1 |
| 5,046,854 A | 9/1991 | Weller et al. | 356/440 |
| 5,047,635 A | 9/1991 | Leaney et al. | 250/256 |
| 5,070,249 A | 12/1991 | White | 250/483.1 |
| 5,087,818 A | 2/1992 | Bellian et al. | 250/361 R |
| 5,120,963 A | 6/1992 | Robinson et al. | 250/363.01 |
| 5,132,539 A | 7/1992 | Kwasnik et al. | 250/361 R |
| 5,182,791 A | 1/1993 | Pollack | 385/147 |
| 5,264,154 A | 11/1993 | Akiyama et al. | 252/301.4 F |
| 5,283,439 A | 2/1994 | Bouissou et al. | 250/368 |
| 5,317,158 A | 5/1994 | McElhaney et al. | 250/367 |
| 5,332,906 A | 7/1994 | Lauf et al. | 250/483.1 |
| 5,338,937 A | 8/1994 | Daghighian et al. | 250/368 |
| 5,397,893 A | 3/1995 | Minette | 250/254 |
| 5,408,097 A | 4/1995 | Wraight et al. | 250/256 |
| 5,548,116 A | 8/1996 | Pandelisev | 250/256 |
| 5,742,057 A | 4/1998 | Frederick et al. | 250/368 |
| 5,796,109 A | 8/1998 | Frederick et al. | 250/368 |
| 5,962,855 A * | 10/1999 | Frederick et al. | 250/361 R |

* cited by examiner

Primary Examiner—Constantine Hannaher
Assistant Examiner—Shun Lee
(74) Attorney, Agent, or Firm—Nixon & Vanderhye P.C.

(57) ABSTRACT

A radiation detector assembly includes a radiation detector enclosed within a shield and a light detector enclosed in a housing and operatively connected to said radiation detector by a threaded connection between the shield and the housing. A first set of elongated, radial springs are located about the circumference of the light detector, radially between the housing and the light detector. A second set of similar radial springs are located about the circumference of the radiation detector, radially between the shield and the radiation detector. A tool casing encloses the detector assembly and a third set of longitudinally extending, circumferentially spaced radial springs are positioned between the tool casing and the detector assembly. Various optical coupler configurations are disclosed.

32 Claims, 5 Drawing Sheets

MAXIMUM VOLUME RUGGEDIZED NUCLEAR DETECTOR

RELATED APPLICATIONS

This is a continuation-in-part of U.S. patent application Ser. No. 09/030,282 filed Feb. 25, 1998, now U.S. Pat. No. 5,962,855, the entire disclosure of which is incorporated herein by reference.

BACKGROUND OF THE INVENTION

The present invention relates generally to highly ruggedized electro-optical devices for detecting radiation within a harsh environment. More particularly, the present invention relates to a radiation detecting device having a spring suspension system that provides for adjusting the resonant frequency and dynamic isolation characteristics while allowing the size of the device to be maximized within the available space in which it must operate.

The present invention also relates to the support of light detecting elements within the radiation detection device and to the optical coupling between the light detecting element and the scintillation element.

Radiation detectors are well known in the drilling industry and are often incorporated into drilling tools for oil wells and into the tools used to log the geologic formations. Such detectors are also used for mining operations, such as coal mining or uranium mining. Radiation detectors typically include a light detecting and quantifying device, such as a photo-multiplier tube, and a scintillation element that may be a crystal or suitably compounded element. The scintillation element functions by capturing radiation from the formation and converting that energy into light. The radiation may be ambient radiation emitted by radioactive materials in the formation, or radiation emitted in response to bombardment of the formation by radiation sources within the tools or equipment in which the detectors are operating.

Light generated within a scintillation element, as a result of intercepting radiation, is transmitted through an optical window into the photo-multiplier tube. The light impulses are transformed into electrical impulses that are transmitted via a data stream to an instrumentation system. Optical coupling elements are normally used between the scintillation element and the light-detecting element in order to achieve better light transmission, and may be used to provide dynamic isolation between the scintillation element and the light-detecting element.

A radiation detector may be incorporated into a variety of instrumentation and/or control systems where harsh environments exist. The process of logging typically is accomplished by lowering the detector into oil wells or survey holes while remaining connected to instrumentation systems by wires. Rapid movement through the holes produces considerable vibration and shock while the device is passing through temperature extremes, in some cases above 200 degrees Centigrade. Measurement While Drilling (MWD) operations or Logging While Drilling (LWD) operations utilize the detectors to help guide the drills and/or to help evaluate the formation, concurrent with the drilling operation, thereby subjecting the detector to extreme vibration and shock, while at temperatures up to 175 degrees Centigrade, or higher. Other drilling applications that subject the radiation detectors to extreme environments include environmental evaluations, geologic surveys and construction projects. Radiation detectors may also be used in coal mines to detect the boundary between the coal and shale or fire clay in order to control the mining equipment and to monitor the operation of the equipment.

In all the above-noted instances, a highly ruggedized detector is essential so that the detector will not fail and will not produce noise as a result of the vibration and shock. Elements that are likely to be damaged or to produce noise due to vibration, such as a scintillation crystal or a photo-multiplier tube, need to be isolated from the induced vibrations.

There is a need to be able to design ruggedized nuclear detectors in a systematic manner rather than using a trial-and-error approach as has been characteristic of the industry. Resonant frequencies can be selected to optimize the dynamic characteristics of the detector and its suspension system for most any vibration environment. There has been a tendency in the industry to design nuclear detectors to withstand shock levels; yet, it is more likely that the most severe punishment to the hardware is a result of the elements resonating with the induced vibrations or repetitive shock, which behaves much like a vibration. Shock parameters do not lend themselves very well to analytical methods required to design a dynamic support system. Consistent with a prevailing view that the environment is characterized by shock which requires cushioning the sensitive element, the general approach often used is to add more cushioning to protect the elements and to add more force to prevent movement. This is generally a poor approach and leads to the trial-and-error design approach based on low resonant frequencies that correspond too closely with the induced vibrations. Typically, soft elastomeric materials are used to provide cushioning, the greater the anticipated shock, the thicker the elastomer to be used. This material can be shaped in the form of boots, or sheaths, and may be achieved by potting the vibration sensitive element in an elastomer. Elastomers tend to change shape faster during large temperature changes due to their high coefficient of thermal expansion or due to high mechanical loading. This change in shape factor, in turn, changes the stiffness properties of the element made with the elastomer. The high thermal expansion also frequently results in high forces when operating at high temperatures. Elastomers tend to permanently deform under high pressure and high temperature. Designs which rely on elastomers for the dynamic support of vibration-sensitive elements seldom can be analytically derived; i.e., they are fundamentally trial-and-error, not easily optimized for best performance.

A major obstacle faced in the design of radiation detectors relates to space constraints. Very little space is available in the tools used in well bores and the industry trend is toward smaller tools, providing even less space. Detectors used on continuous miners need to be small in order for them to be strategically placed. The result of these factors is that it is very important to maximize the use of the space available for radiation detectors.

The inventions described in U.S. Pat. No. 5,962,855 provide means for maximizing the size of the scintillation element within its housing. A larger scintillation element increases the cross-section and therefore increases the probability that a gamma ray or neutron will pass into the element. Also, the greater thickness increases the probability that the gamma ray or neutron will produce a scintillation, rather than just pass through the element. They also provide for a highly effective support system that provides for a high resonant frequency of the scintillation element and provides for thermal compliance needed at high temperatures. However, neither the '282 application, nor any other previous art, provide a fully suitable means for maximizing the volume of the light detecting element, such as a photo-multiplier tube. In addition, other prior devices do not present a suitable means for providing dynamic isolation for highly ruggedized detectors while, at the same time, maximizing the volume available to the detector. In the typical application, when significant levels of isolation are provided, comparative large amounts of space are occupied by the support system, typically consisting of potting or boots made from elastomeric material.

There are problems associated with supporting light-detecting devices in radiation detectors that are similar to those problems which are solved for scintillation elements as described in the '855 patent.

Prior constructions utilize elastomers in the space between the light-detecting device and the surrounding housing in order to provide for cushioning to protect against shock and vibration. Use of elastomers in this space, particularly potting, causes other problems, however, that must be solved, some of which are usually not fully satisfactory solutions. First, prior boots or potting made from elastomers are thicker than required for the present invention. If potting is used to fill the space, provisions must be made for the thermal expansion of the potting material at high temperatures to avoid excessive force being applied to the photo-multiplier tube. At high temperatures, photo-multiplier tubes have limited life and must occasionally be replaced. Removal of the potting and replacement of the potting is difficult. Special support tubes or housings are sometimes used to simplify the procedure. If the potting or boot is made stiff in order to achieve a high resonant frequency, it is very stiff in the axial direction so that it is difficult to allow for thermal expansion of the optical coupler and other differential thermal expansions in the assembly.

In order to increase the life of the light-detecting element and to prevent noise from being generated in that element by mechanical vibration or shock, it is important to avoid resonance at the frequencies of the high energy vibrations. The higher energy vibrations, induced by or through the tool in which the detector is placed, tend to be at frequencies below 500 Hertz for most applications. Setting the resonant frequency of the light-detecting element well above the frequency of the high energy vibrations is a useful approach to avoiding resonance. However, the method selected to achieve a high resonant frequency often introduces other serious problems. For example, the stiff support system may not allow the light-detecting element to be kept in contact with the optical coupler between the light-detecting element and the scintillation element, during thermal excursions. Another problem encountered in using a stiff support system, particularly when the support systems are made from non-metallic materials, is that the high thermal expansion of the materials places high forces on the light-detecting element. Also, when non-metallic support elements are used, the support characteristics are usually not consistent over time and temperature ranges. Often, attempts to ensure that a support system has a sufficiently high resonant frequency for worst case conditions, results in a resonant frequency that is too high. The tiny elements in a light-detecting device tend to be more easily damaged by vibrations in the 1,500 Hertz to 2,500 Hertz range, than at frequencies below 1,500 Hertz.

The above discussion relates primarily to the method of support and the associated vibrations in the radial directions. There are important considerations for the axial (longitudinal) direction as well. An optical coupler is usually placed between the light-detection element and the scintillation element. In some cases, these couplers are very thin and are bonded to both elements. Such an approach provides for a good optical path but mechanically locks the two elements together so that the vibrations and shock introduced into the scintillation shield, or housing, are transmitted directly to the light-detecting element. High frequencies, above 1500 Hertz can be damaging to the small parts in the light-detecting element. A second problem is that these light-detecting devices typically degrade after operating for long periods at high temperatures. Replacing a degraded element is difficult when it is bonded directly to the scintillation element. In other cases, thicker couplers are used, having grease applied to both sides. Such couplers tend to degrade over long periods of time, however, as the grease is prone to squeeze out, leaving spots with no grease. Use of high forces on the rear of the element to avoid separation from the coupler during high vibration and shock tends to cause the coupler to degrade more rapidly. Another problem often encountered is that the stiff support system provided for the element, used in order to achieve a high resonant frequency, can cause the element to be pulled away from the coupler. It can also allow the element to be stuck in a position away from the coupler during temperature cycling. While making attempts to solve the above problems, the light-detecting element may be given freedom to move such that noise will be generated at the interface with the coupler, during high vibration or shock. A problem inherent in some prior art is that the method for ensuring that the light-detecting element does not move in an axial direction, relative to the scintillation element, results in the element not being free to move within its support system in the radial direction, as intended.

Even assuming that the scintillation element and the light-detecting element are properly supported with a support system having a sufficiently high resonant frequency, there are other important design considerations at the next level of assembly. A ruggedized detector assembly, having a scintillation element and a light-detecting element, may be installed in the tool (i.e., the tool casing) in different ways. Potting or boots are often used between the detector and the tool or machine in order to provide cushioning. Such non-metallic support techniques usually require a considerable amount of space and tend to not have very predictable or consistent dynamic characteristics. In other cases, the detector may be hard mounted to the tool or machine so that the vibration and shock experienced by the tool or machine is directly transmitted to the detector. In order to avoid the problems associated with these common integration techniques, relatively complex designs and/or complex assembly procedures are required. The desired approach is to provide mechanical isolation without the problems often associated with providing that isolation.

SUMMARY OF THE INVENTION

The problems of the prior art and commonly used techniques for supporting the light detection element in a radiation detector assembly and for supporting the detector assembly itself are overcome to a great extent by the present invention. The present invention provides an effective means for dynamically supporting light-detector elements, such as photo-multiplier tubes, and for supporting the complete detector assembly within a tool casing. Very little space is required for the dynamic support; yet, this invention allows easy adjustment of the resonant frequency of the photo-multiplier tube and of the detector as a whole.

For purposes of this disclosure, reference will be made often to a photo-multiplier tube as one example of a light detection element. Similarly, a scintillator is used herein as an example of a radiation detector. Often, the term "resonant frequency" of an element is intended to mean "resonant frequency of the elements within the support system."

One aspect of this invention is the use of radial springs to support the light detection element that can be selected to provide a wide range of resonant frequencies and static force conditions which will be relatively constant over time and the required temperature ranges. This invention works best if the radiation scintillator is also supported by radial springs as disclosed in the '282 application.

Another aspect is a special optical coupler that has raised concentric rings that define oil retention areas between the rings. Use of this coupler provides for effective coupling of light into the light detector device and provides for mechanical isolation. The axially extending radial springs around the circumference of the light detector provide for a high resonant frequency, in combination with axial springs at the remote end of the light detector, provide positive contact pressure with the coupler under high vibration conditions.

Springs around the complete detector assembly, provide for dynamic isolation from vibrations induced by the tool. In order to accomplish dynamic isolation, these springs are selected to provide a frequency less than 0.7 times the resonant frequencies of the scintillation element and the photo-multiplier tube. The isolation provided by these springs around the detector greatly attenuate the vibrations that are near the resonant frequencies of the scintillation element and the photo-multiplier tube or other light-detecting element.

An important consequence of using radial springs is that radial motion causes the springs to deflect and thereby to slide on the surface of the housing around the light detection element or the structure around the radiation detector element. Sliding friction provides damping which minimizes the effect of vibrations that happen to match, or nearly match, the resonant frequency of the support system. In a different way, high vibration or shock in the axial direction that results in motion of the photo-multiplier tube in its support or of the detector within its support causes the element to slide on the surface of the radial springs. Therefore, motion in the axial direction also results in significant damping by the radial springs. The amount of axial restraint provided by the radial springs, through friction, is controlled by adjusting the amount of static force applied by the springs and by the coefficient of friction on the surface of the springs.

The resonant frequency of the supported element is determined by the mass of the element and by the stiffness of the support system. Stiffness is adjusted by selection of material type, the thickness of the springs, the width of the springs, and the number of springs used. The static force applied to the supported element is determined by the amount the springs are deflected, and by the shape, stiffness, and number of springs. By properly adjusting these parameters, a wide range of dynamic and static characteristics can be designed into the desired dynamic suspension system.

In a preferred embodiment, the detector includes a scintilator in its shield, a photo-multiplier in its housing, the shield and the housing being mechanically attached by threads. A first optical coupler is positioned on one side of a sapphire window, between the window and the face of the scintillation element, and a second optical coupler is located on the other side of the window, between the window and the light detection element. The couplers each have raised, concentric rings on one or both sides thereof defining areas into which oil has been placed. A metal ring secured to the scintillator shield, extending around the window, has a sleeve-like extension that is used to hold the window and couplers in the proper position. In a variation of this arrangement, one or both couplers could be bonded to the window, with raised rings defining oil retaining grooves formed only on the sides of the couplers which interface with the scintillator and photo-multiplier tube. Radial springs are placed around the photo-multiplier, the springs having axial lengths approximately that of the photo-multiplier tube.

In a variation similar to the above embodiment, a single coupler is bonded to the window within the shield for the scintillator. Concentric rings for retaining oil are only on the side of the coupler facing the scintillator. There is no need for a device to position the coupler since it is bonded. This bonded coupler is well suited to instances where the scintillator is not hygroscopic. In the latter, the scintillator does not have to be encased in a hermetically sealed shield, and can be in direct contact with the coupler without a window in between, so that the coupler can be bonded directly to the scintillator. A coupler that has been bonded on a single side has the characteristic of being much stiffer than non-bonded couplers. This added stiffness must be considered in the choice of dynamic and static force properties being sought for the design. Stiff couplers also exhibit less ability to comply with variations in the face of the photo-multiplier tube than do softer couplers.

In another embodiment, the detector utilizes a suspension system comprising three separate support systems. In this description, the spring support systems around the inner elements (scintillator and photo-multiplier tube), will be referred to as the "inner suspension system,." And the spring system between the detector assembly and the tool casing will be referred to as the "outer suspension system."

The outer suspension system, using radial springs as utilized in the inner suspension system, is useful for providing an improved method of support for most any ruggedized nuclear detector that is to be held within another housing or structure. The invention provides a reliable method of vibration and shock isolation but that also requires very little space and can be adjusted over a wide range of frequencies and static forces to satisfy a wide range of engineering requirements. The use of metallic springs eliminates certain problems associated with the use of elastomers, such as changes in properties during temperature changes, changes in properties over time, high coefficient of thermal expansion and associated high forces and change in shape factor.

In its broader aspects therefore, the invention therefore relates to a radiation detector assembly comprising a radiation detector element, e.g., a scintillator, and a light detection element operatively connected to the radiation detector element, the light detection element seated within a housing; and a first set of elongated, radial springs located about the circumference of the light detection element, radially between the housing and the light detection element.

In another aspect, the invention relates to a radiation detector assembly comprising an axially elongated radiation detector axially aligned with a light detector, with a window between the radiation detector and the light detector; a first optical coupler located between the radiation detector and the window, the first optical coupler having a pair of opposite faces, at least one of the pair provided with a plurality of raised concentric rings having relatively small widths defining areas having relatively larger widths between the rings that are filled with oil.

In still another aspect, the invention relates to a radiation detector assembly comprising a radiation detector; a light detector operatively connected to the radiation detector in axial alignment therewith; the radiation detector and the light detector received within a housing that is surrounded by an external tool casing; and a plurality of discrete, longitudinally extending, radial springs circumferentially spaced about the housing, and extending axially along said housing, radially between the housing and the tool casing, the plurality of radial springs comprised of a metal material.

In still another aspect, the invention relates to a radiation detector assembly comprising a radiation detector radially supported within a first surrounding component by a first set of longitudinally extending, circumferentially spaced radial springs; a light detector radially supported within a second surrounding component by a second set of longitudinally extending, circumferentially spaced radial springs; a tool casing enclosing the first and second surrounding components; and a third set of discrete, longitudinally extending, circumferentially spaced radial springs between the tool casing and the first and second surrounding components, the third set of radial springs comprised of a metal material.

BEST MODE FOR CARRYING OUT THE INVENTION

Figures 1, 1A:
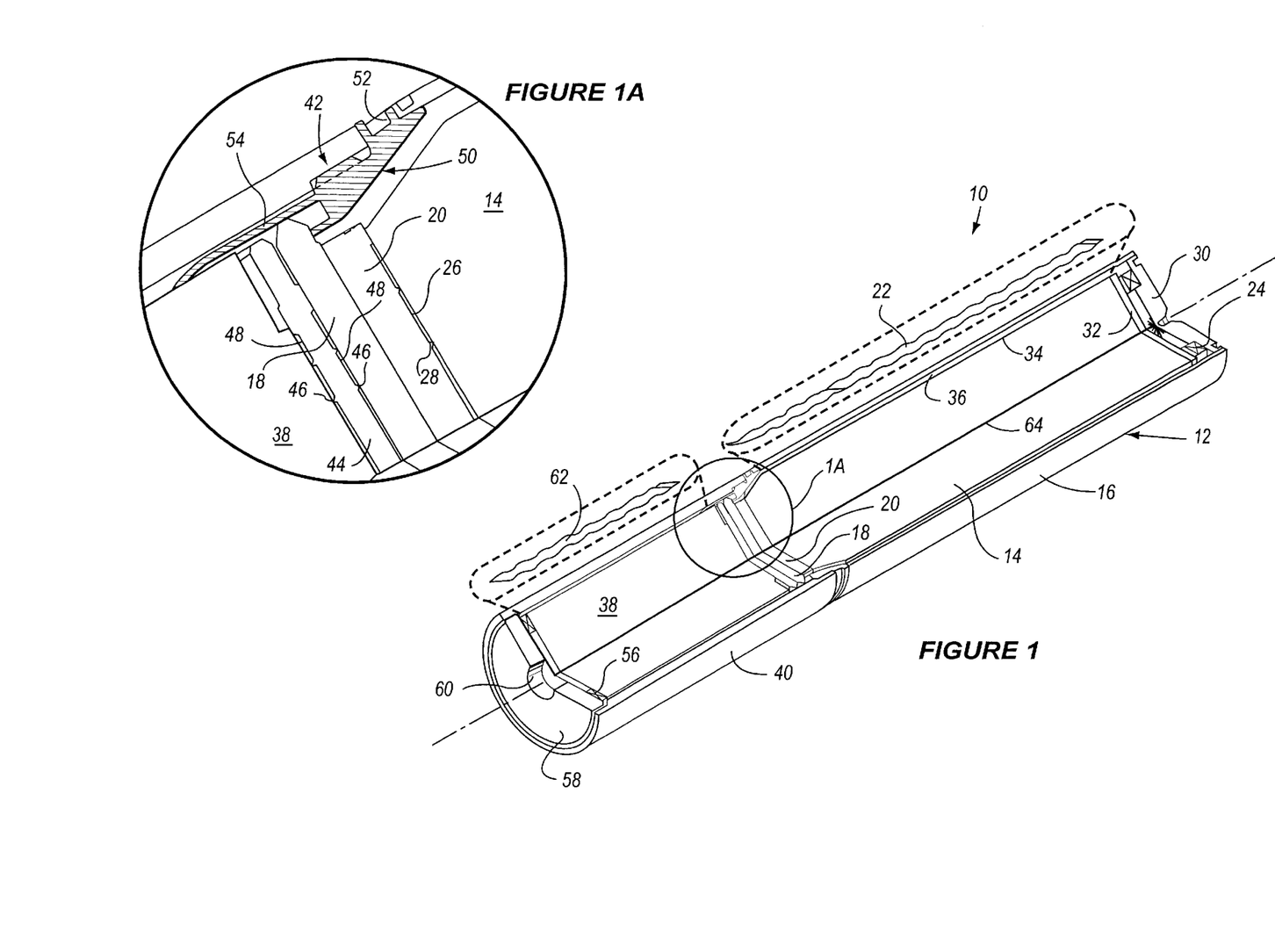
FIG. 1 perspective view, partly broken away, illustrating a ruggedized nuclear detector in accordance with a first embodiment of the invention.
FIG. 1A is a detail taken from FIG. 1.
Figure 2:
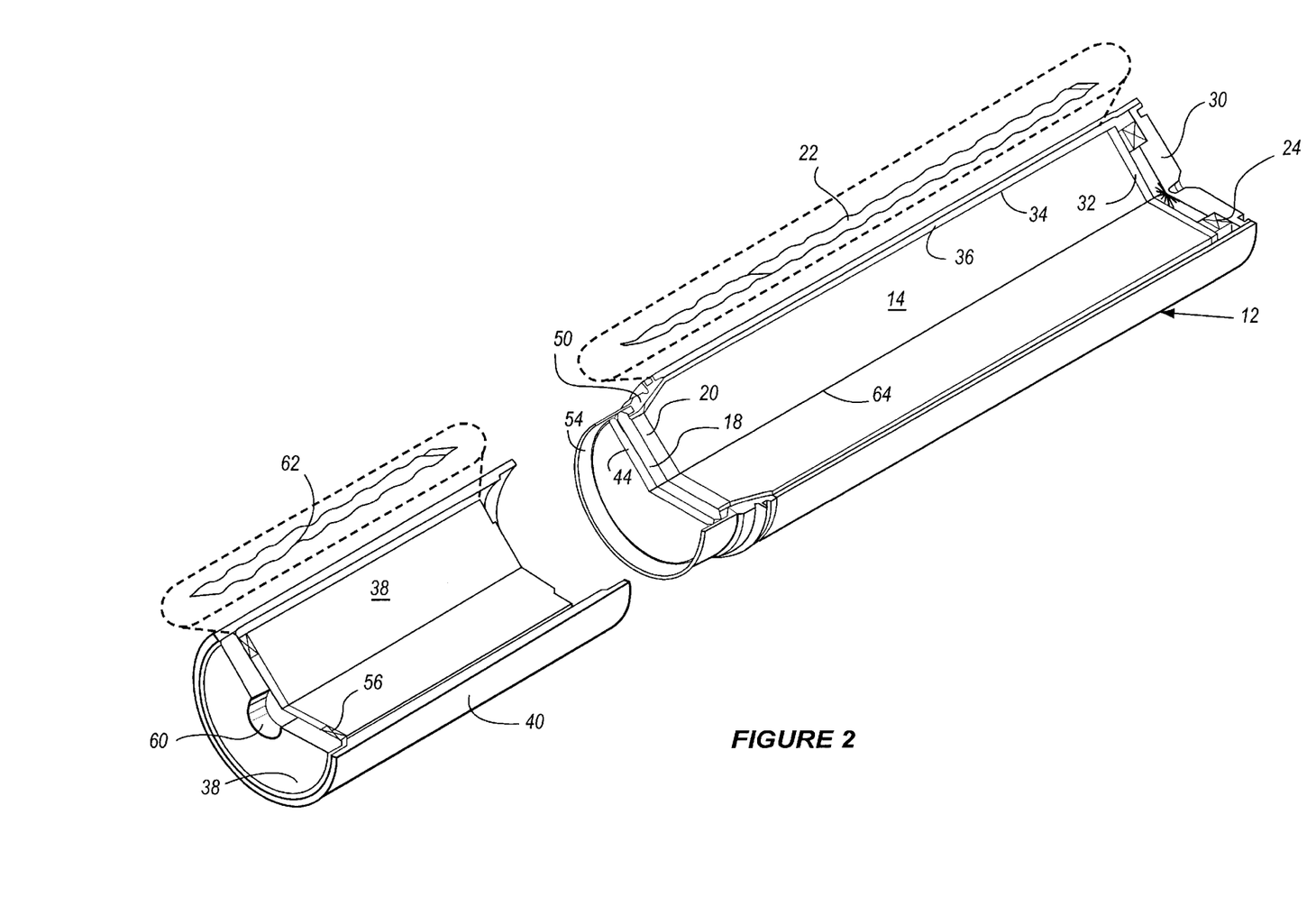
FIG. 2 is an exploded view of the detector assembly shown in FIG. 1.
Figure 3:
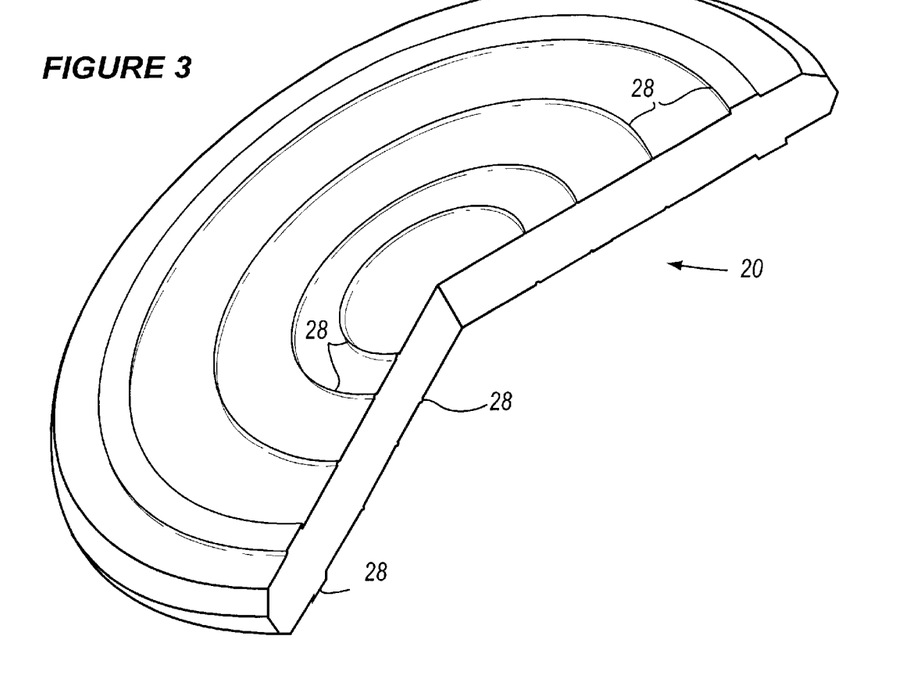
FIG. 3 is a partially cut away perspective view of an optical coupler in accordance with the invention.

Referring now to the drawings, especially FIGS. 1–4, there is shown in FIG. 1 a nuclear detector which has been ruggedized for extreme environments where temperatures may reach as high as 175 degrees Centigrade and vibration levels may be equivalent to 20 Grms or higher. The detector is usable in Measurement While Drilling (MWD), Logging While Drilling (LWD), Wireline Applications, continuous miners, geological surveys, scientific probes, and harsh commercial and industrial applications such as nuclear power plants.

The detector assembly 10 includes a hermetically sealed scintillation package 12 having a scintillator 14, a cylindrical shield 16 surrounding the scintillator, a window 18 for transmitting light from the package, an optical coupler 20 placed between the scintillator 14 and the window 18. Also shown are radial springs 22 located at circumferentially spaced locations around the scintillator 14, and axial springs 24 at one end of the scintillator which bias the scintillator toward and into engagement with the optical coupler 20. Oil 26 fills the areas or grooves defined by the raised concentric rings or ridges 28 (best seen in FIG. 3) on the optical coupler 20 to provide improved optical transmission and to lubricate the interfaces between the optical coupler 20 and the scintillator 14. In this regard, FIGS. 1 and 1A show rings 28 on only one side of the coupler 20, the opposite side bonded to the window 18. It will be understood that rings 28 (and resultant oil retaining areas or grooves) may be formed on both sides of the coupler 20 if desired.

An end cap 30 is located at the end away from the window which is welded to the shield 16. The axial springs 24 are positioned between the end cap 30 and a compression plate 32 that is in contact with a reflector 34 at the end of the scintillation element 14. The axial springs 24 apply a force to the compression plate 32 which transmits that force to the reflector 34 and on to the end of the scintillation element 14 in order to bias the scintillation element 14 to the optical coupler 20 which is, in turn, pressed against the window 18.

A sidewall axial restraint and compliance assembly (SARCA) 36 is placed around the reflector 34. One end of this SARCA 36 restrains the scintillation element 14 so that it will have a high resonant frequency in the axial direction. The SARCA also works in combination with the radial springs 22 to provide compliance with the thermal expansion of the scintillation element 14. In particular, the radial springs 22 limit the pressure that is applied to the cylindrical portion of the element 14. The SARCA 36 contains a layer that conforms to the reflector 34 and a layer made of stainless steel, separated by a high temperature grease that allows the scintillation element 14 to expand in the axial direction. Other details regarding the SARCA and how the SARCA works with the radial springs are described in the above identified pending application Ser. No. 09/030,282. Multiple configurations of the SARCA may be used, depending upon the geometry of the scintillation element and the dynamic suspension and static loading properties that are desired for the design.

It should be understood, however, that scintillation package designs which do not use the axial springs 24 and/or SARCA 36 may be used with the current invention. An important deficiency inherent with the scintillation packages described in prior art is that it is very difficult to establish, by analytical means, the resonant frequency of those packages when the active dynamic and static loading elements are elastomers or include elastomers. Even if the frequency is determined by test at a given set of conditions, the frequency is prone to change in response to large temperature changes and will usually change over long periods of time. This should not be construed to be a limitation on or a deficiency in the present invention. Regardless of the configuration of the support provided for the scintillation element within its shield or housing, the current invention can be applied to the support of the light-detecting element and to the support of the entire detector assembly. However, if the resonant frequency of the scintillation element is known, it is then possible to take full advantage of the present invention, which allows the application of analytical means to accomplish an integrated design and to optimize the design for specific requirements.

The scintillator 14 may be a crystal or a compounded element, selected for the specific nuclear detection requirements. The element can be a sodium-iodide (NaI) crystal or glass doped with lithium. It can also be made from substances such as anthracene, bismuth germanium oxide (BGO), cerium iodide (CeI), cesium iodide (CsI), gadolinium orthosilicate (GSO), Lutetium orthosilicate (LSO), and other like substances. The window 18 may be glass but is preferably sapphire.

The light detecting element, the photo-multiplier tube 38 as described herein, is received within a cylindrical housing 40, and the latter is attached to the shield 16 by a threaded connection 42, best seen in FIG. 1A. Adhesive may be used between the threads to fix the components together. A second optical coupler 44 engages the side of window 18 opposite the first coupler 20. Coupler 44 as shown includes raised concentric rings 46 defining areas or grooves 48 as described in connection with coupler 20. Here again, the coupler 44 may have raised concentric rings on both sides, or it can be bonded directly to the window 18 on one side.

Note also that, as shown in FIG. 1A, a positioning ring 50, welded to the shield 16 at 52, includes an extended sleeve-like portion 54 which extends forward over the end of the photo-multiplier tube 38, serving to position the window 18 and the couplers 20 and 44, particularly during high vibration, shock and thermal excursions.

At its opposite end, the photo-multiplier tube 38 is biased toward the window 18 by axial springs 56 (which may be a pair of annular, nested wave springs). The housing 40 is closed by an end cap 58, having an aperture 60 for instrumentation wires (not shown).

In order to maximize the use of available space for the detector assembly 10, it is important that the outside diameter of the housing 40 for the photo-multiplier tube 38 not be larger than the shield 16 around the scintillator 14. Yet, in order to achieve maximum light-detecting performance, it is important that the effective area of the light-detecting surface in the photo-multiplier 38 (or photodiode or other light detecting element) be as large as possible. These two constraints require that the housing 40 for the photo-multiplier be thin and that the radial space between the outer portion of the photo-multiplier 38 and the inside surface of the housing 40 be as small as possible. Housing 40 is preferably made of steel (e.g., 301 stainless or spring steel) or titanium.

Figure 4:
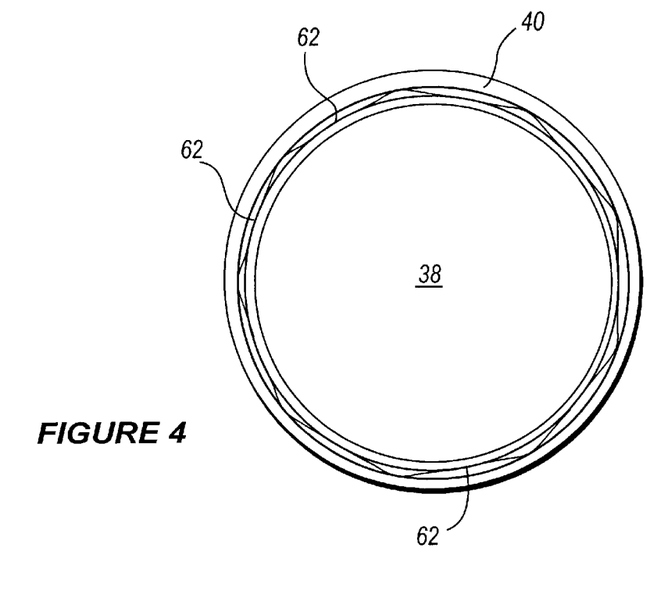
FIG. 4 is a section view of the photo-multiplier tube component of the detector.

Perhaps most importantly, once design and process provisions have been made to solve the problems discussed earlier relating to support of the light detector device, the resonant frequency will be driven to some value, probably not easily determined, and probably not optimized for the application. This invention, however, is very different in concept. Radial springs 62 are employed to support the light detector device or photo-multiplier 38 in a manner similar to the scintillator 14 described above. Springs 62, like springs 22, are elongated, spring strips, which establish radially compressive forces between the photo-multiplier 38 and the housing 40. Here again, the springs 62 are circumferentially spaced about the photo-multiplier, as best seen in FIG. 4. Metallic (preferably steel or titanium) springs have predictable and consistent mechanical properties. A design strategy can be established for a given detector type and for the environment in which it must operate. Thus, the radial springs can be selected in type, width, thickness and shape to achieve the static force and dynamic parameters required to satisfy the requirements, all based on reliable analytical methods. Once the detector is built, these properties will remain constant over time and temperature. And, the metallic radial springs 62 require a fraction of the space that must be used by non-metallic materials. Since the shape factor does not change with loading and temperature, the mechanical and dynamic responses are much more linear and predictable. A coating may also be applied to the surface of the photo-multiplier tube 38 to further reduce the friction, when that is desirable. Similarly, the surface properties of the radial springs can be changed by the application of coatings or lubricants, such as polytetrafluorethylene, available under the name TEFLON®.

A small, ruggedized photo-multiplier tube that is approximately one inch diameter, two inches long, and weighing approximately 0.1 pounds would typically have a set of 10 steel radial springs 62 which are 0.250" wide and 0.003" thick. Larger detectors my have springs which are 0.5 to 1.0" wide and 0.006" to 0.015" thick, but the dimensions may vary depending on specific applications.

The radial dynamic stiffness of this configuration would be approximately 4136 pounds per inch. The resonant frequency of the photo-multiplier tube in the radial direction for this configuration would be approximately 635 Hertz. The resonant frequency in the axial direction would be high; but, motion in the axial direction would be limited by the friction force on the springs. If extreme vibration or high shock is experienced in the axial direction, the tube 38 would begin to slide on the springs 62, limiting accelerating forces on parts within the photo-multiplier tube. The high damping produced by the sliding friction reduces amplification due to resonance. The springs 56 at the rear of the photo-multiplier tube 38 are selected to be strong enough to overcome the friction on the radial springs 62 and to provide a force at the interfaces between the tube 38, coupler 44 and window 18. For a window that would match a tube of this general size range, the coupler would need a minimum of 12 pounds force at all times. To provide this minimum force, a spring force of 20–25 pounds would be selected for the axial spring at the rear of the photo-multiplier tube.

In addition, the use of the ringed optical coupler 44 provides a lubricated interface that ensures the response of the coupler to loading changes during high vibration will remain consistent. Removal of the photo-multiplier 38 is much easier since there is no potting to remove and replace and no additional support tubes or structures to construct and implement.

In operation, radiation enters the scintillator 14 and is converted into a light pulse. The light exits through one end of the scintillator 14 into the oil 26 that is held in place by concentric rings 28 on the optical coupler 20. The light then passes through the coupler 20, through the oil on the other side of the coupler, then through the window 18. Light exiting the window 18 enters the oil 26 on the surface of the optical coupler 44, through the coupler 44, through the oil 26 on the other side of the coupler 44 and into the faceplate of the photo-multiplier tube 38. The photo-multiplier tube 38 quantifies the light impulse and produces electrical impulses that are transmitted to an electronic assembly (not shown).

All of the elements of the detector assembly 10 are usually cylindrical or annular and are axially symmetric about a longitudinal axis 64; however, if the element is small, it can be rectangular and the principles of this invention will apply.

Figure 5:
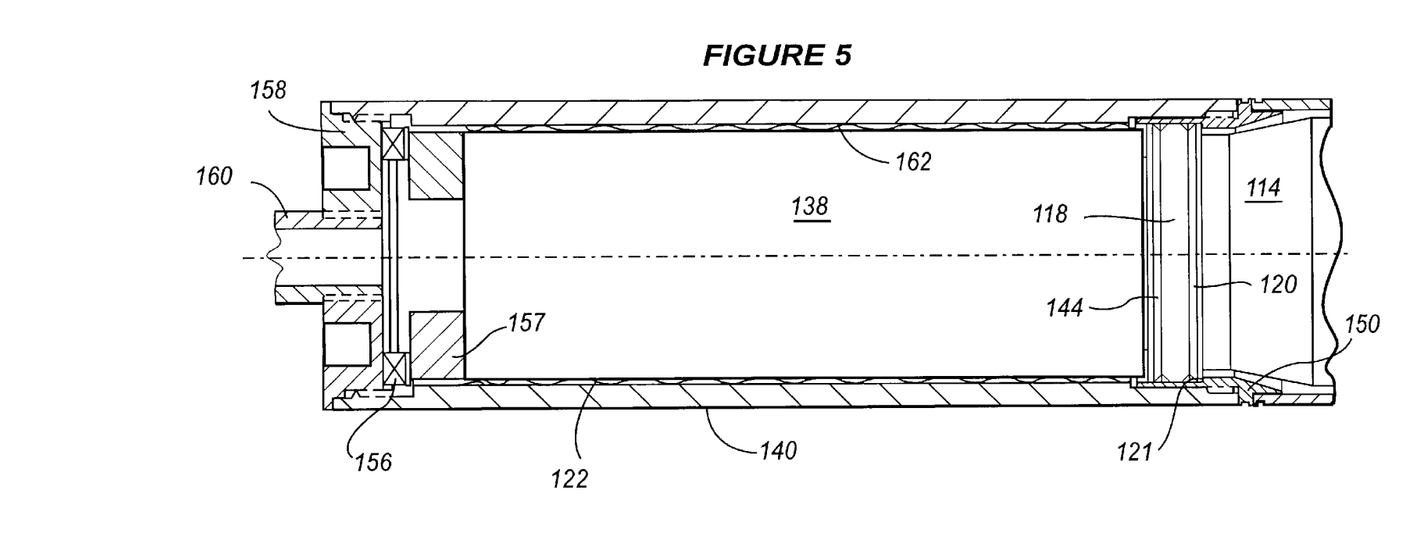
FIG. 5 is a section view of a photo-multiplier tube component of a detector in accordance with another embodiment of the invention.

Turning to FIG. 5, a photo-multiplier 138 is enclosed within a housing 140, the latter secured to a scintillator 114 in the same manner as described in connection with FIGS. 1–4. Radial springs 162 are located at circumferentially spaced locations about the photo-multiplier, between the latter and the housing 140. Axial springs 156 are located at one end of the photo-multiplier, biasing the latter toward the scintillator 114, with a compression plate 157 axially between the springs 156 and the photo-multiplier 138. An end cap 158 closes the housing 140, and is provided with a tubular spindle 160 which encloses instrumentation wires (not shown).

In this embodiment, optical couplers 120 and 144 are sandwiched about the window 118, but unlike the configuration in FIGS. 1–4, both couplers are "floating" relative to the window 118, i.e., neither coupler is bonded to the window. A stop shoulder 121 on the positioning ring 150 locates the coupler 120, while the coupler 144 and window 118 are urged into engagement with the coupler 120 by the axial springs 156.

Figure 6:
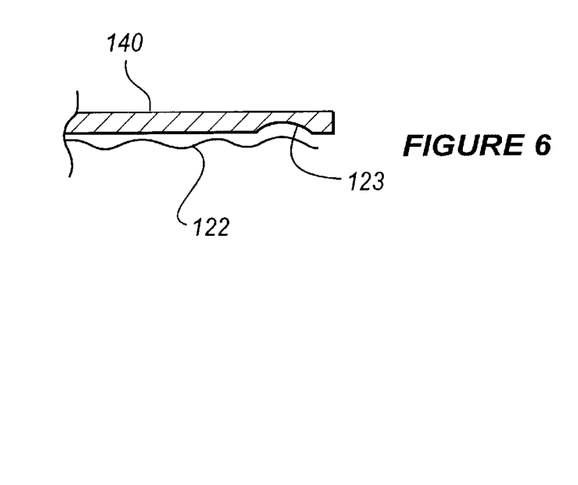
FIG. 6 is a partial section illustrating the manner in which an axially extending radial spring can be retained in its axial position within a housing.

With reference to FIG. 6, a groove 123 may be provided in one end of the housing 140 (or housing 40) to provide a means for locking the radial springs 122 (or 22) in position so that they will not move axially during vibration, shock or thermal excursions. Note that the end most ripple or wave (or specially formed detent) in the spring may seat within the groove 123.

Figure 7:
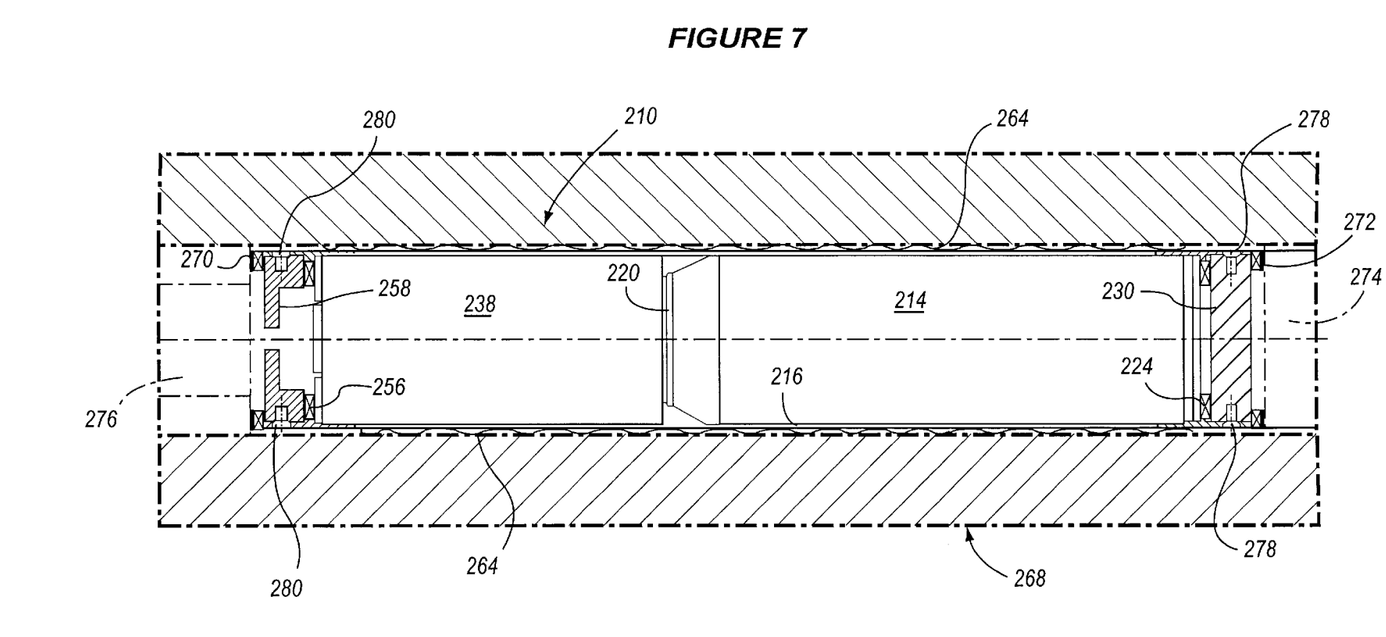
FIG. 7 is a section view of another embodiment of a nuclear detector assembly in accordance with the invention, in further combination with a tool casing.

FIG. 7 illustrates a further embodiment of the invention, employing a third or outer spring suspension system. Other variations are included and are explained below. A detector assembly 210 includes a scintillator 214 and photo-multiplier tube 238, enclosed within a single housing or shield 216, because the scintillator is not hygroscopic, and therefore, there is no need to hermetically seal the scintillator relative to the photo-multiplier. Between the shield 216 and the scintillator 214, there are a series of radial springs (similar to springs 22) as described above. Similarly, a series of radial springs (similar to springs 162) are located between the shield 216 and the photo-multiplier tube 238. These radial spring sets (comprising the inner suspension systems) have been omitted from FIG. 7 for the sake of simplicity. There is a third, outer spring suspension system comprising a plurality of radial springs 264 extending axially along the entire detector assembly, between the shield 216 and the interior surface of a surrounding tool casing 268 in which the detector assembly is inserted. These springs 264 may each extend the length of the assembly, or they may be provided in two axial sections to facilitate insertion from opposite ends of the assembly. These springs provide dynamic isolation from vibration and shock that is present in the tool, machine or structure in which the detector is located.

The scintillator 214 and photo-multiplier 238 are supported axially by springs 224, 256 at opposite ends of the assembly, the springs engaged by end caps 230 and 258. This arrangement is similar to the axial support systems described above in connection with FIGS. 1–5. Additional axial support is provided in this embodiment by axial springs 270, 272 external of the end caps 230, 258, held in place by tool casing end caps 274, 276.

In FIG. 7, because the scintillator 214 is not hydroscopic, coupler 220 can be in direct contact with both the scintillator 214 and the photo-multiplier 238, i.e., no window is required. Thus, the coupler 220 may be bonded directly to the tapered end of the scintillator 214. This is a simpler and stiffer arrangement which also eliminates the need for a positioning ring for the coupler. Coupler 220 will, however, be provided with oil retaining areas or grooves as described above on that side which interfaces with the photo-multiplier 238, so as to "float" relative to the photo-multiplier.

It should also be noted that, in light of the simpler internal shield arrangement, i.e., shield 216 surrounding both components 214, 238 of the detector assembly, the end caps 230 and 258 are secured to the shield by radially arranged screw sets 278, 280.

The design strategy, using this invention, is to isolate the detector assembly from relatively high frequencies and to minimize resonance with lower frequencies. To accomplish this strategy, the approach is to select the springs that support the scintillator and the photo-multiplier so that the resonant frequency of these elements will be higher than the resonant frequency of the integrated detector assembly within its support system in the tool casing. With this arrangement, induced vibrations with frequencies substantially above the chosen resonant frequency of the detector assembly will be greatly attenuated by the outer suspension system around the detector assembly. Frequencies near or below the resonant frequency of the detector assembly will be substantially below the selected resonant frequency of the scintillator, in its support system, and below the selected resonant frequency of the photo-multiplier, in its support system. As a result, the scintillator and photo-multiplier tube will not resonate with the induced vibrations so that these vibration swill not be amplified.

In one example, the inner suspension system is tuned to a resonant frequency in the radial direction of at least 500 Hertz. The outer suspension system is tuned to provide a resonant frequency of approximately 300 Hertz. With this arrangement, vibrations induced into the outer suspension system will be effectively isolated if they are significantly above the resonant frequency of the outer suspension system. Typically, the inner suspension system should be tuned to a frequency that is at least 1.4 times the frequency of the outer suspension system. Frequencies substantially below 300 Hertz will be transmitted through the outer support system to the inner support systems; but, since the inner suspension systems are tuned to 500 Hertz or higher, the inner suspension systems will not resonate with those lower frequencies. Frequencies near 300 Hertz will be amplified by the outer suspension system, the amount of amplification being inversely related to the amount of damping provided by the frequencies around 300 Hertz. At 420 Hertz, the 300 Hertz system will have a response of approximately 1, beyond which the response will reduce. If it is determined that a given application has high vibrations at or around 300 Hertz, the frequency of the outer support system can be adjusted to avoid a resonance at that frequency. The wide range of adjustment that can be made by this invention allows the design to be chosen to specifically minimize the effects of a known, unusually severe vibration condition. Often a tool or structure has certain resonance characteristics that should be avoided if possible.

The radial springs 264 around the outside of the detector assembly are coated with a lubricant such as polytetrafluorethylene, available under the name TEFLON®, to allow easier installation and to allow movement of the detector assembly within the tool casing, in the axial direction, for high level vibrations or shock. The resonant frequency of the detector in the axial direction will be high up to the point where the accelerations from the vibration or shock overcome the friction force of the springs. At that point, the detector assembly will begin to slide and the effective resonant frequency will drop. The motion is then resisted by the combined effect of restraint forces produced by the axial springs and by the sliding friction on the radial springs. The effect of the sliding friction is to provide damping so that the detector assembly does not tend to amplify the vibration. Once the magnitude of the vibration or shock drops below the restraint forces, the detector assembly will stop moving once again.

The selection or design of the desired properties of the inner and outer suspension systems for this embodiment, using the current invention, is accomplished in two steps that are related. The vibration environment and range of temperatures essentially establish the conditions for which the detector is optimized. It is found that if an element is properly designed to withstand the worst case vibrations, it will also usually withstand the shock conditions. It also needs to be recognized that for the environment within a well bore having rotating tools or on a continuous miner having a rotating cutter that repetitive shocks can occur, the result of which is very similar to a vibration in which worst case conditions exist for exciting a resonance. Rapid movement of a tool through a well bore will also result in repetitive shocks which can be analytically dealt with better as a vibration than as a single shock. Resonance produces amplification of the induced vibration or shocks, the consequence being particularly harmful for repetitive, periodic shocks. Even in applications for high shock conditions, such as in perforating guns in which hundreds of shape charges are exploded, a scintillation element that has been properly designed for extreme vibration conditions, using this invention, will survive the shocks as well.

For a typical installation in a Measurement While Drilling or Logging While drilling application, there are intense vibrations over a wide range of frequencies. The most intense vibrations are typically below as few hundred hertz, so that the strategy would be to isolate the vibration sensitive elements in the detector from the higher frequencies and to minimize resonance of those vibration sensitive elements with the lower frequencies. A typical choice would be to require the resonant frequency of the scintillation element and the photo-multiplier to be above 500 Hertz and the frequency of the suspension system around the detector near 300 Hertz. With the resonant frequency of the scintillator set to a relatively high value, the displacement of the scintillator at resonance, within its shield, will be kept low unless the amplitude of the induced vibration is excessive. Minimizing movement of the scintillator within its shield is crucial to preventing noise from being introduced into the output of the scintillator.

The choice of 300 Hertz for the resonant frequency of the outer suspension system might be selected to be a lower value if the higher energy vibrations or repetitive shock conditions were thought to be substantially less than about 210 Hertz. The benefit from using a lower resonant frequency for the outer system is that greater isolation would thereby be provided for the inner system at the higher frequencies. The worst case induced frequencies would be 300 Hertz and 500 hertz where there is no resonance. The inner assembly will be essentially immune to frequencies as they drop well below 300 Hertz, the range where the higher energies tend to reside. For the choice of 300 Hertz for the outer system, an induced vibration of 500 Hertz would be attenuated approximately 40% by the outer system. A 30 G, 500 Hertz vibration entering the outer system would pass through the system at approximately 18 G. If the Q-factor for the inner system is three at 500 Hertz, then the supported element would experience 54 G, instead of 90 G without the isolation. Higher frequencies would be attenuated considerably more. The amplitude of the motion of the supported element, for this example, would be less than +/−0.002 inch, which is below the level normally required to produce noise in the output. At higher frequencies, the amplitude would quickly drop to much lower values.

It will be appreciated that the invention as described above can be accommodated to detector assemblies of various sizes and configurations with routine skill, and is not limited to the specific embodiments illustrated herein.

While the invention has been described in connection with what is presently considered to be the most practical and preferred embodiment, it is to be understood hat the invention is not to be limited to the disclosed embodiment, but on the contrary, is intended to cover various modifications and equivalent arrangements included within the spirit and scope of the appended claims.

What is claimed is:

1. A radiation detector assembly comprising a radiation detector element and a light detection element operatively connected to said radiation detector element, said light detection element seated within a housing; and a first set of discrete elongated, radial springs located about the circumference of said light detection element, and extending axially along said light detection element, radially between the housing and the light detection element, said first set of radial springs comprised of a metal material.

2. The radiation detector assembly of claim 1 wherein said housing is constructed of steel.

3. The radiation detector assembly of claim 2 wherein said housing has an exterior coating of a composition modifying the coefficient of friction of the steel.

4. The radiation detector assembly of claim 3 wherein said composition comprises polytetrafluorethylene.

5. The radiation detector assembly of claim 1 wherein said housing is provided with an annular groove at one end thereof, ends of said plurality of radial springs seated in said annular groove.

6. The radiation detector assembly of claim 1 further comprising a window between said radiation detector element and said light detection element, and an optical coupler between said window and said radiation detector element, said coupler having a plurality of raised, concentric rings on at least one face thereof, and wherein oil is retained in areas between said rings.

7. The radiation detector assembly of claim 6 wherein said optical coupler is formed with a plurality of raised, concentric rings on both faces thereof, and wherein oil is retained in areas between said rings on said both faces.

8. The radiation detector assembly of claim 7 and including a second optical coupler between said window and said light detection element, said second optical coupler having a plurality of raised, concentric rings on at least one face thereof that retain oil in areas between said rings.

9. The radiation detector assembly of claim 6 and including a positioning ring attached to said radiation detector element, extending axially toward said light detection element so as to surround said window and said optical coupler.

10. The radiation detector assembly of claim 1 and further comprising a second set of discrete, longitudinally extending radial springs circumferentially spaced about said radiation detector element, radially between said radiation detector element and a cylindrical shield surrounding said radiation detector element, said second set of radial springs comprised of a metal material.

11. The radiation detector assembly of claim 10 and further comprising an external tool casing, said detector assembly received in said tool casing, and wherein a third set of discrete, longitudinally extending radial springs are located between said detector assembly and said tool casing, said third set of springs comprised of a metal material.

12. The radiation detector assembly of claim 1 wherein said housing has an end cap at one end thereof remote from said radiation detector element, and wherein one or more axial springs are located axially between said light detection element and said end cap.

13. The radiation detector assembly of claim 1 wherein said first set of radial springs are comprised of steel.

14. The radiation detector assembly of claim 1 wherein said first set of radial springs are comprised of titanium.

15. The radiation detector assembly of claim 1 wherein said first set of radial springs are coated with a lubricant.

16. The radiation detector assembly of claim 1 further comprising an optical coupler between said radiation detector element and said light detection element, said optical coupler bonded on one side to said radiation detector element, an opposite side of said optical coupler having a plurality of raised concentric rings formed thereon with oil retained in areas between said rings.

17. A radiation detector assembly comprising an axially elongated radiation detector axially aligned with a light detector, with a window axially between said radiation detector and said light detector; a first optical coupler located axially between said radiation detector and said window, said first optical coupler having a pair of opposite faces, at least one of said pair of faces provided with a plurality of raised, concentric rings having relatively small widths defining areas having relatively larger widths between said rings that are filled with oil.

18. The radiation detector assembly of claim 17 wherein the other of said pair of faces is bonded to said window.

19. The radiation detector assembly of claim 17 wherein the other of said pair of faces of said first optical coupler is provided with a plurality of raised, concentric rings having relatively small widths defining areas having relatively larger widths between said rings that are also filled with oil.

20. The radiation detector assembly of claim 17 and including a second optical coupler located axially between said light detector and said window, said second optical coupler having a pair of opposite faces, at least one of said faces of said second optical coupler provided with a plurality of raised, concentric rings having relatively small widths defining areas having relatively larger widths between said rings that are filled with oil.

21. The radiation detector assembly of claim 20 wherein the other of said pair of faces of said second optical coupler is provided with a plurality of raised, concentric rings having relatively small widths defining areas having relatively larger widths between said rings that are also filled with oil.

22. The radiation detector assembly of claim 17 further comprising an annular positioning ring secured to one end of said radiation detector, said ring extending toward said light detector, said positioning ring surrounding said window and said first optical coupler.

23. A radiation detector assembly comprising a radiation detector; a light detector operatively connected to said radiation detector in axial alignment therewith; said radiation detector and said light detector received within a housing that is surrounded by an external tool casing; and a plurality of discrete, longitudinally extending, radial springs circumferentially spaced about said housing, and extending axially along said housing radially between said housing and said tool casing, said plurality of radial springs comprised of a metal material.

24. The radiation detector assembly of claim 23 wherein said plurality of radial springs each have lengths substantially corresponding to a combined length of said radiation detector and said light detector.

25. The radiation detector assembly of claim 24 wherein each of said plurality of radial springs is formed by two axial sections.

26. The radiation detector assembly of claim 23 wherein said housing is closed at opposite ends by a first pair of end caps, and wherein said tool casing is closed at opposite ends by a second pair of end caps; and further wherein axial springs are located between said first and second pairs of end caps.

27. The radiation detector assembly of claim 23 wherein said radial springs are coated with a lubricant.

28. A radiation detector assembly comprising:

a radiation detector radially supported within a first surrounding component by a first set of longitudinally extending, circumferentially spaced, discrete radial springs;

a light detector radially supported within a second surrounding component by a second set of longitudinally extending, circumferentially spaced, discrete radial springs;

a tool casing enclosing said first and second surrounding components; and a third set of longitudinally extending, circumferentially spaced, discrete radial springs between said tool casing and said first and second surrounding components, said third set of radial springs comprised of a metal material.

29. The radiation detector assembly of claim 28 wherein said third set of radial springs are coated within a lubricant.

30. The radiation detector assembly of claim 28 wherein said first and second sets of radial springs have a higher resonant frequency than that of said third set of radial springs.

31. The radiation detector assembly of claim 30 wherein the resonant frequency of the first and second sets of radial springs is at least 1.4 times the resonant frequency of the third set of radial springs.

32. The radiation detector assembly of claim 28 wherein said first, second and third sets of longitudinally extending, circumferentially spaced, discrete radial springs are flat.

* * * * *